(12) United States Patent (10) Patent No.: US 12,596,395 B2

Pang (45) Date of Patent: Apr. 7, 2026

(54) HANDSHAKING MECHANISM FOR CLOCK NETWORK CONTROL

(71) Applicant: ATI TECHNOLOGIES ULC, Markham (CA)

(72) Inventor: Erwin Pang, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 30 days.

(21) Appl. No.: 17/953,503

(22) Filed: Sep. 27, 2022

(65) Prior Publication Data

US 2024/0103561 A1 Mar. 28, 2024

(51) Int. Cl.
G06F 1/10 (2006.01)

(52) U.S. Cl.
CPC ...................................... G06F 1/10 (2013.01)

(58) Field of Classification Search
CPC ...................................... G06F 1/10; G06F 1/12
See application file for complete search history.

(56) References Cited

U.S. PATENT DOCUMENTS

| | | | | | |
|---|---|---|---|---|---|
| 6,128,678 | A | * | 10/2000 | Masteller | ................... G06F 5/08 |
| | | | | | 710/52 |
| 7,444,385 | B2 | * | 10/2008 | Blumrich | ........... H05K 7/20836 |
| | | | | | 709/224 |

| | | | | | |
|---|---|---|---|---|---|
| 9,383,805 | B2 | * | 7/2016 | Jouin | ................. H03K 19/0016 |
| 9,645,603 | B1 | * | 5/2017 | Chall | ......................... G06F 1/10 |
| 2012/0275473 | A1 | * | 11/2012 | Yamamoto | ............ H04J 3/0688 |
| | | | | | 370/496 |
| 2013/0043904 | A1 | * | 2/2013 | Ivory | ..................... H03K 5/135 |
| | | | | | 326/93 |
| 2013/0194016 | A1 | * | 8/2013 | Wimer | ............... H03K 19/0016 |
| | | | | | 327/199 |
| 2015/0067363 | A1 | * | 3/2015 | Jouin | ......................... G06F 1/06 |
| | | | | | 713/320 |
| 2017/0214480 | A1 | * | 7/2017 | Kim | ......................... G06F 1/06 |
| 2018/0246819 | A1 | * | 8/2018 | Stevens | ..................... H04L 7/00 |
| 2019/0278357 | A1 | * | 9/2019 | Lee | ........................ G06F 1/3234 |
| 2021/0141412 | A1 | * | 5/2021 | Jeon | ........................... G06F 1/12 |

* cited by examiner

*Primary Examiner* — Phil K Nguyen

(57) ABSTRACT

A method for clock distribution network control includes determining, at a first clock node of a plurality of clock nodes within a clock distribution network, a downstream clock request status. A clock request signal is transmitted by the first clock node to an upstream parent node based on the downstream clock request status. A clock buffer of the first clock node is toggled based at least in part on the clock request signal to the parent node. If the first clock node receives an asserted clock request signal from one or more downstream child nodes and clock acknowledgment signal from the parent node, a clock enable signal is asserted to the clock buffer to output a clock signal to the one or more downstream child nodes.

18 Claims, 4 Drawing Sheets

HANDSHAKING MECHANISM FOR CLOCK NETWORK CONTROL

BACKGROUND

An integrated circuit (IC) device includes circuits or logic elements for performing any of a variety of functions. A field programmable gate array (FPGA) device includes configurable logic elements that may be adapted to perform a variety of functions. Similarly, an application specific integrated circuit (ASIC) device, though generally not configurable in the same manner as an FPGA, may be designed to perform specific desired functions. Such devices, either configurable or not configurable, often use clock signals to synchronize different circuit elements in the devices. Accordingly, an IC device generally includes a clock tree structure, clock network, or other similar clock signal distribution structure that is used to route clock signals to different parts of the IC.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

A clock distribution network is an on-chip interconnect network that delivers a synchronizing signal across the chip to coordinate data flow. Synchronous clocking of large digital circuits or systems that include multiple circuits becomes increasingly power intensive as chip and network sizes increase in modern systems with large numbers of fan outs and distribution paths. For example, in various system on chip (SOC) architectures, a single timing reference such as a clock source is generated from a centralized clock module where the phase lock loop (PLL) analog macro is located. This module is not located adjacent to most of its IP consumers within the SOC chip such that its clock output needs to be distributed via a global clocking network to reach each of the IP consumer endpoints. This globally distributed clock tree network consumes significant amounts of power as it is toggling most of the time due to clock gating being handled within the IP consumers at the leaves of the clocking network.

To address these problems and to enable improved system power management, FIGS. 1-4 describe systems and methods for handshaking, demand-based clock network control that reduces unnecessary transmission power along global clock tree networks. In various embodiments, methods of clock distribution network control include determining, at a first clock node of a plurality of clock nodes within a clock distribution network, a downstream clock request status. A clock request signal is transmitted by the first clock node to an upstream parent node based on the downstream clock request status. A clock buffer of the first clock node is toggled based at least in part on the clock request signal to the parent node. If the first clock node receives an asserted clock request signal from one or more downstream child nodes and clock acknowledgment signal from the parent node, a clock enable signal is asserted to the clock buffer to output a clock signal to the one or more downstream child nodes. In this manner, the clock network control request-and-acknowledgement mechanisms described herein allows for the toggling of clock supply on a per clock node basis. By only toggling on the clocking branches leading to active clock consumers (and disabling the clock outputs of inactive clocking branches), overall power usage along the clock network is decreased.

Figure 1:
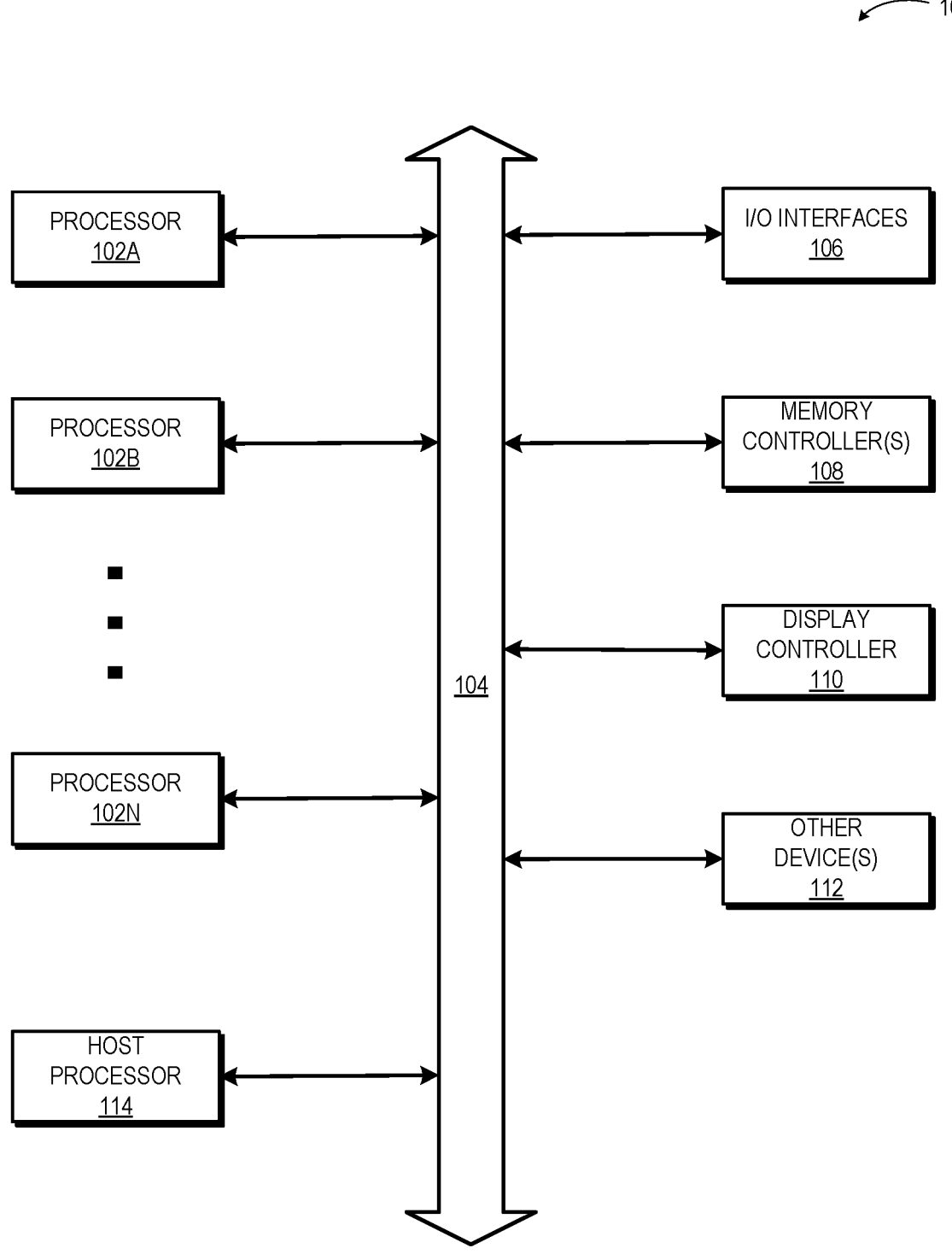
FIG. 1 illustrates a block diagram of a computing system implementing handshaking-based clock network control in accordance with some embodiments.

FIG. 1 illustrates a block diagram of one embodiment of a computing system 100 implementing handshaking-based clock network control in accordance with some embodiments. In various embodiments, the computing system 100 includes at least one or more processors 102A-N, fabric 104, input/output (I/O) interfaces 106, memory controller(s) 108, display controller 110, and other device(s) 112. In various embodiments, to support execution of instructions for graphics and other types of workloads, the computing system 100 also includes a host processor 114, such as a central processing unit (CPU). In various embodiments, computing system 100 includes a computer, laptop, mobile device, server, or any of various other types of computing systems or devices. It is noted that the number of components of computing system 100 vary in some embodiments. It is also noted that in some embodiments computing system 100 includes other components not shown in FIG. 1. Additionally, in other embodiments, computing system 100 is structured in other ways than shown in FIG. 1.

Fabric 104 is representative of any communication interconnect that complies with any of various types of protocols utilized for communicating among the components of the computing system 100. Fabric 104 provides the data paths, switches, routers, and other logic that connect the processors 102, I/O interfaces 106, memory controller(s) 108, display controller 110, and other device(s) 112 to each other. Fabric 104 handles the request, response, and data traffic, as well as probe traffic to facilitate coherency. Fabric 104 also handles interrupt request routing and configuration access paths to the various components of computing system 100. Additionally, fabric 104 handles configuration requests, responses, and configuration data traffic. In some embodiments, fabric 104 is bus-based, including shared bus configurations, crossbar configurations, and hierarchical buses with bridges. In other embodiments, fabric 104 is packet-based, and hierarchical with bridges, crossbar, point-to-point, or other interconnects. From the point of view of fabric 104, the other components of computing system 100 are referred to as "clients". Fabric 104 is configured to process requests generated by various clients and pass the requests on to other clients.

Memory controller(s) 108 are representative of any number and type of memory controllers coupled to any number and type of memory device(s). For example, the type of memory device(s) coupled to memory controller(s) 108 include Dynamic Random Access Memory (DRAM), Static Random Access Memory (SRAM), NAND Flash memory, NOR flash memory, Ferroelectric Random Access Memory (FeRAM), or others. Memory controller(s) 108 are accessible by processors 102, I/O interfaces 106, display controller 110, and other device(s) 112 via fabric 104. I/O interfaces

106 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices are coupled to I/O interfaces 106. Such peripheral devices include (but are not limited to) displays, keyboards, mice, printers, scanners, joysticks or other types of game controllers, media recording devices, external storage devices, network interface cards, and so forth. Other device(s) 112 are representative of any number and type of devices (e.g., multimedia device, video codec).

In various embodiments, each of the processors 102 is a parallel processor (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). In various embodiments, each parallel processor 102 is constructed as a multi-chip module (e.g., a semiconductor die package) including two or more base integrated circuit dies communicably coupled together with bridge chip(s) such that a parallel processor is usable (e.g., addressable) like a single semiconductor integrated circuit. As used in this disclosure, the terms "die" and "chip" are interchangeably used. Those skilled in the art will recognize that a conventional (e.g., not multi-chip) semiconductor integrated circuit is manufactured as a wafer or as a die (e.g., single-chip IC) formed in a wafer and later separated from the wafer (e.g., when the wafer is diced); multiple ICs are often manufactured in a wafer simultaneously. The ICs and possibly discrete circuits and possibly other components (such as non-semiconductor packaging substrates including printed circuit boards, interposers, and possibly others) are assembled in a multi-die parallel processor.

In some embodiments, each of the individual processors 102 includes one or more base IC dies employing processing stacked die chiplets in accordance with some embodiments. The base dies are formed as a single semiconductor chip package including N number of communicably coupled graphics processing stacked die chiplets. In various embodiments, the base IC dies include two or more direct memory access (DMA) engines that coordinate DMA transfers of data between devices and memory (or between different locations in memory). It should be recognized that although various embodiments are described below in the particular context of CPUs and GPUs for ease of illustration and description, the concepts described here is also similarly applicable to other processors including accelerated processing units (APUs), discrete GPUs (dGPUs), artificial intelligence (AI) accelerators, other parallel processors, and the like.

As will be appreciated, parallel processors and other multithreaded processors 102 implement, in various embodiments, multiple processing elements (not shown) (also interchangeably referred to as processor cores or compute units) that that are configured to execute concurrently or in parallel multiple instances (threads or waves) of a single program on multiple data sets. Several waves are created (or spawned) and then dispatched to each processing element in a multi-threaded processing unit. In various embodiments, a processing unit includes hundreds of processing elements so that thousands of waves are concurrently executing programs in the processing unit. The processing elements in a GPU typically process three-dimensional (3-D) graphics using a graphics pipeline formed of a sequence of programmable shaders and fixed-function hardware blocks.

As described in more detail with respect to FIGS. 2-4 below, a computing system implements a scalable clock network control mechanism for reducing power consumption on integrated circuits. For example, portions of a clock tree (or other clock distribution network) within the IC may be gated or switched off by control modules that monitor activity of areas on the IC downstream of each control module.

Figure 2:
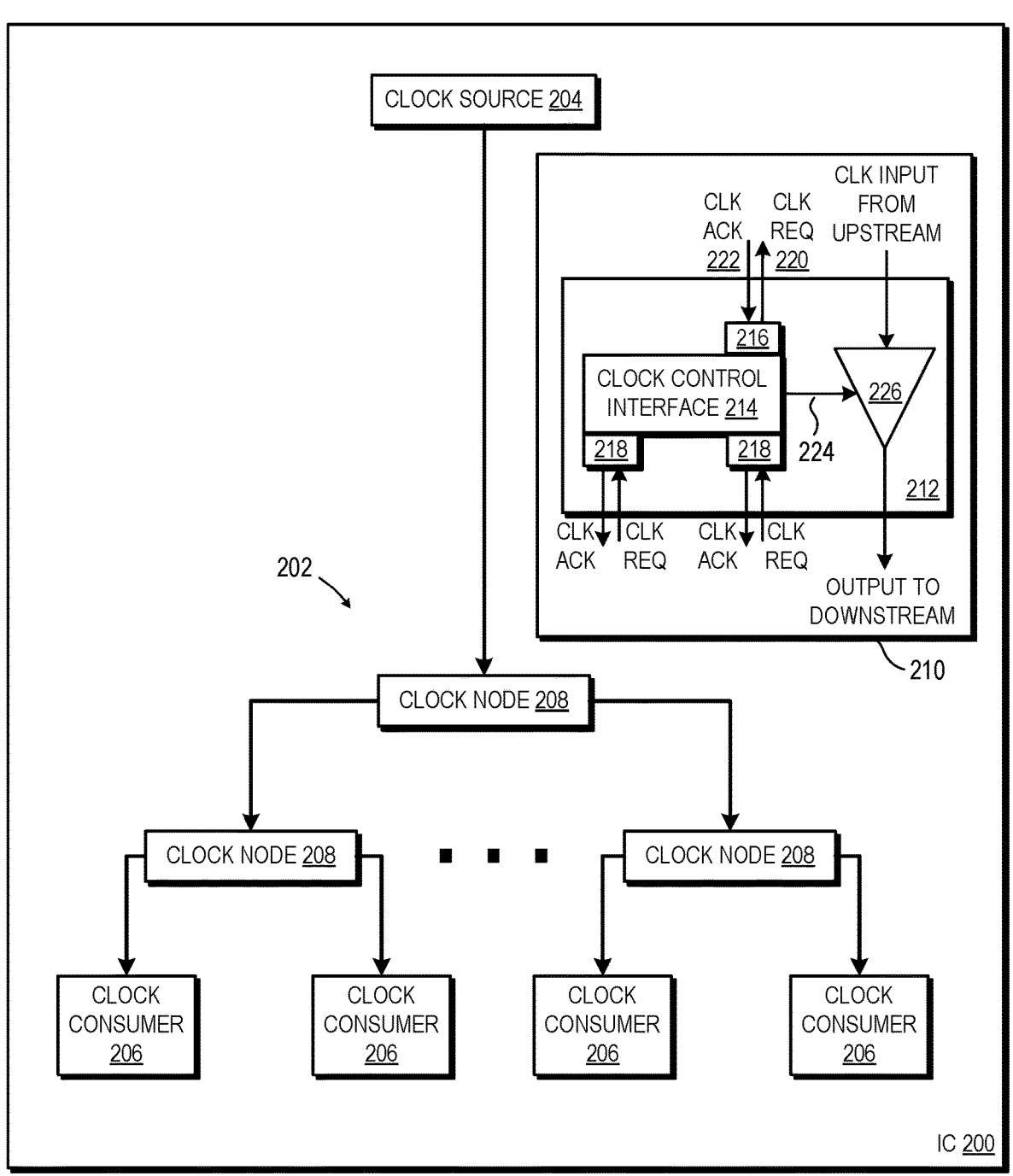
FIG. 2 is a block diagram of portions of an integrated circuit implementing handshaking-based clock network control in accordance with some embodiments.

Referring now to FIG. 2, illustrated is a block diagram of portions of an integrated circuit 200 implementing hand-shaking-based clock network control in accordance with some embodiments. Such IC 200, in various embodiments, includes one or more processors 102 or other computing system 100 components of FIG. 1, a system-on-chip (SoC), or other integrated circuit. The IC 200 includes a clock distribution network 202 for globally distributing a clock signal CLK.

For ease of illustration and description, the clock distribution network 202 is illustrated in FIG. 2 as a binary tree network including four levels of hierarchy starting at a root 204 (also referred to herein as "clock source 204") of the clock distribution network 202 and ending at two or more clock consumers 206 at the leaves (or endpoints) of the clock distribution network 202 for providing clock signals to various locations within the IC 200. In various embodiments, the clock distribution network 202 is a buffered clock tree, the tree including at least the root 204 and a plurality of clock buffers (described below). As used herein, the "leaf" level generally refers to a level of distribution in a clock network or "tree" in which a base clock signal (the trunk of the clock tree) has been routed via the trunk and the branches of the clock tree and is being split into multiple clock signals for local distribution (i.e., at the leaf nodes of the clock tree that do not have any children nodes).

Although the clock distribution network is illustrated here in the context of a binary tree, any distribution network topology may be included at the IC 200 using the guidelines provided herein without departing from the scope of the present disclosure. Further, the clock distribution network 202, in various embodiments, can include any number of hierarchy levels and may include any number of clock buffers to facilitate the distribution of clock signals to the leaves, or other endpoints, of the clock distribution network 202. The disclosed clock distribution network architecture yields large-scale clock networks for chips of arbitrary size. At the top levels of the hierarchy, in various embodiments, the disclosed architecture includes a buffered clock distribution network, although aspects of the disclosed systems and methods are not limited to practice with any particular type of distribution network. For example, the clock distribution network need not include buffers and may be as simple as a single line.

In some embodiments, a reference clock signal is supplied to the root 204 of the clock distribution network 202, and its source can be a crystal, a phase-locked loop (PLL), a clock up/down-converter, or any other generator of a periodic clock signal. In some embodiments, such as illustrated in FIG. 2, the root is a clock source 204 or other clock signal generator that generates a clock signal for driving the clock tree within the IC 200. The clock source 204 is implementable using various types of clock circuitry, including a PLL, a delay locked loop (DLL), delay circuitry, and any other type of circuit capable of producing clock signals.

As will be appreciated by those skilled in the art, conventional power management of global clocking network involves shutting off the clock at its root generator. This one-shot shut off can only be engaged when none of the clock consumers (e.g., clock consumers 206 of FIG. 2) need an active clock signal for operation. This could be limited to the scenario when the entire IC 200 has entered its lowest inactive power state or has been powered off during full chip level idling period. However, when one (or more) of the clock consumers 206 at the endpoints (e.g., clock consuming device) needs a clock signal to operate, the clock root 204 and thus the entire clock distribution network 202 may need to keep toggling. With this conventional power management method, the average power dissipation of the global clock network is not optimized given that the probability of having the entire IC 200 staying at idle state is smaller than having a subset of the entire IC 200 staying at idle state.

To better regulate power consumption by the clock distribution network 202 itself (as opposed to individual clock consumers 206), the IC 200 includes a clock control module at each of the clock nodes 208 that is implemented on a per node basis. The term "node" as used herein indicates a connection point within the logic circuitry and may be a connection point between discrete components, an input connection point, an output connection point, and the like. Thus, for example, the primary logic circuitry described herein includes a plurality of clock nodes, that is, a plurality of connection points where the clocking circuitry clock outputs are connected. In various embodiments, each clock node is more than a just connection point and includes one or more discrete components that receive the clock signal input and changes states in response to the clock input signal. Therefore, each clock node 208, in various embodiments, include one or more discrete components such as described herein.

As shown in detailed view 210, the clock control module 212 of each clock node 208 includes a clock control interface 214 having one upstream clock request/acknowledge interface 216 and one (or more) downstream clock request/acknowledge interfaces 218. The term "upstream" as used herein indicates a direction closer to the clock signal supply (e.g., clock source 204) and the term "downstream" indicates a direction closer to the consumers of clock signals at the leaves of the clock tree (e.g., clock consumers 206). That is, the clock supply originates from upstream and is distributed to downstream consumers via the clock control module 212 residing in each clock node 208.

In various embodiments, each clock control module 212 determines whether clock signals should be enabled or disabled based on clock requests received (or not received) from downstream nodes. For example, if a clock control interface 214 of a clock control module 212 receives one or more clock requests from downstream at its downstream clock request/acknowledge interfaces 218, then the clock control interface 214 initiates a clock request 220 via its upstream clock request/acknowledge interface 216 to a parent clock node immediately upstream. In various embodiments, upon receiving a clock acknowledgement 222 from upstream that the upstream clock supply is available, the clock control interface 214 asserts a clock enable signal 224 to a clock buffer 226 of the clock control module 212. This clock enable signal 224 instructs the clock buffer 226 to turn on clock signal distribution to downstream clock nodes and also acknowledges to the downstream consumers accordingly.

However, if the clock control interface 214 does not receive a clock request signal at any of its downstream clock request/acknowledge interfaces 218, then the clock control interface 214 withdraws (or otherwise de-asserts) the clock request 220 via its upstream clock request/acknowledge interface 216 to the parent clock node immediately upstream. Further, based at least in part on not receiving any clock request signals at any of its downstream clock request/acknowledge interfaces 218, the clock control interface 214 also de-asserts the clock enable signal 224 to the clock buffer 226 to disable the clock buffer for reducing unnecessary power dissipation on its downstream clocking network. When the clock buffer 226 is turned off, the clock buffer output wiring (i.e., wires driven by the clock buffer 226) also stops toggling. That is, each clock node 208 regulates its toggling activity by monitoring whether immediately downstream clock nodes have made clock requests and reporting that information to an immediately upstream clock node.

When applied recursively on a per-node basis, this information as to whether a clock signal is needed is populated from the bottom up (i.e., each endpoint clock signal consumer or node informs its immediately upstream clock node as to whether a clock signal is needed or not). For example, in various embodiments, a clock node 208 turns off its clock buffer 226 and disables its clock request signal 220 to its parent node (e.g., can be binary on a single signal line, where bit value '1'=need clock signal and bit value '0'=don't need clock signal) when a clock request signal is not received from downstream. Otherwise, the clock buffer 226 is kept on and the clock node 208 continues sending a clock request signal to its parent node. Each clock node 208 performs the same clock request check and provides the corresponding signal going up the clock tree. In this manner, the clock control module 212 is implemented in every clock node 208 to form a global hand-shaking based clocking topology that regulates clock supply on demand via a per-module basis and only turns on the clock signal paths from the clock source 204 to the endpoint, clock consumers 206 that actually need a clock signal. That is, the clock enable signal 224 to the clock buffer 226 is driven by the handshaking—from the downstream request acknowledge and upstream clock requests. By turn off the clock nodes 208 that do not currently need a clock signal, the IC 200 is able to reduce unnecessary transmission power along the clock distribution network 202 and reduce overall power consumption.

Although the clock distribution network 202 is described here in the context of having a clock control module 212 at each clock node 208, those skilled in the art will recognize that the IC 200 can include a distribution network topology with any number of clock control modules 212 without departing from the scope of the present disclosure. For example, in some embodiments, the clock distribution network 202 includes a clock control module 212 at only a subset of all total clock nodes (e.g., at only the first two levels of the network hierarchy closest to the clock source 204). As will be appreciated, decreasing the number of clock control modules 212 also decreases the granularity at which the clock signal distribution paths may be toggled on and off. Additionally, although the clock distribution network 202 is described here in the context of distributing a single common clock source 204 to two or more remote clock consumers 206, other embodiments include distribution of two or more clock sources via the clock distribution network 202.

Figure 3:
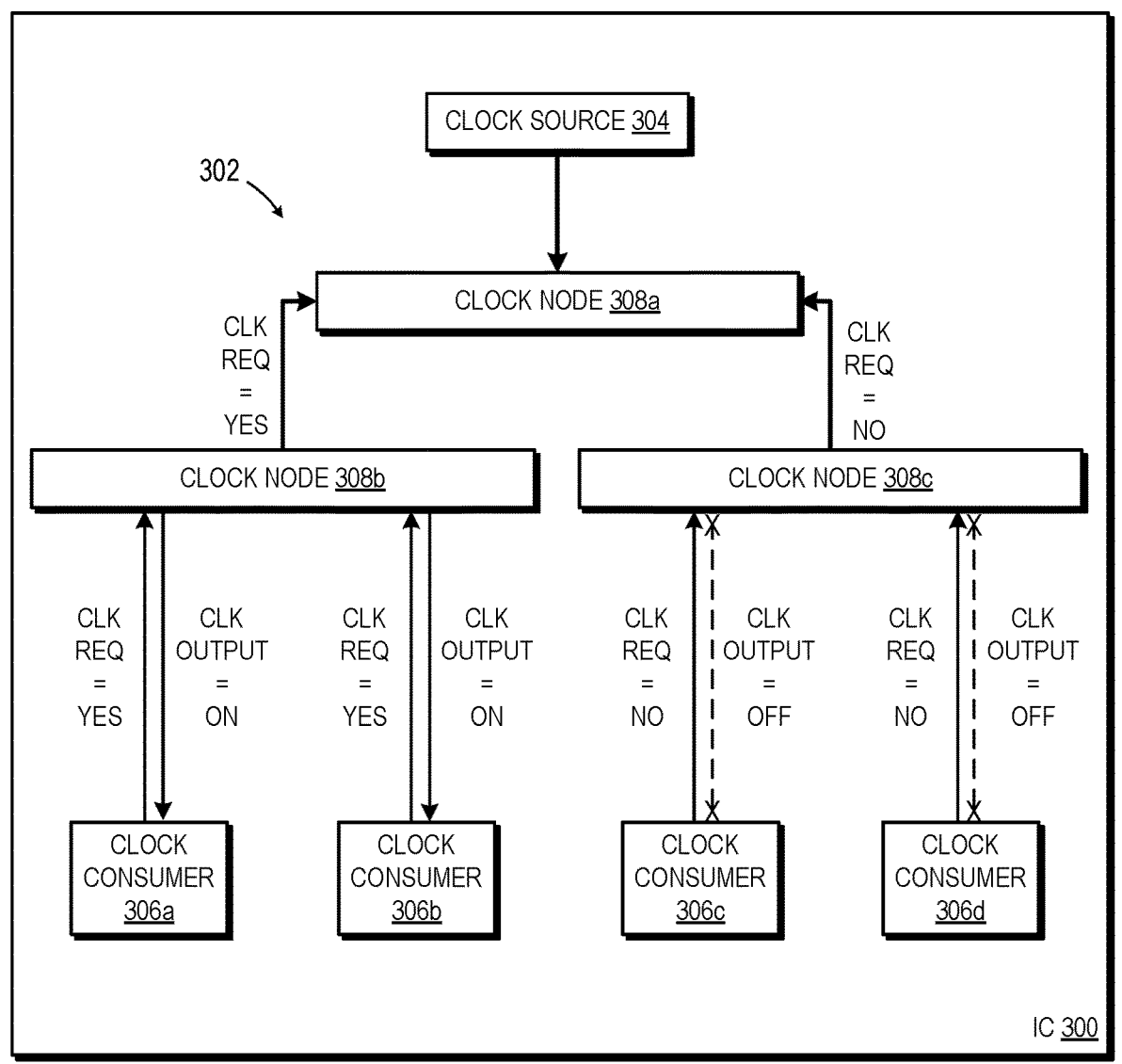
FIG. 3 is a block diagram illustrating an example of handshake-based clock network control in accordance with some embodiments.

Referring now to FIG. 3, illustrated is an example of handshake-based clock network control implemented in accordance with some embodiments. Similar to IC 200, the integrated circuit 300 of FIG. 3 includes a clock distribution network 302 for globally distributing a clock signal CLK. For ease of illustration and description, the clock distribution network 302 is illustrated in FIG. 3 as a binary tree network including four levels of hierarchy starting at a root 304 of the clock distribution network 302 and ending at two or more clock consumers 306 (i.e., clock consumer 306*a*, clock consumer 306*b*, clock consumer 306*c*, and clock consumer 306*d*) at the leaves (or endpoints) of the clock distribution network 302 for providing clock signals to various locations within the IC 300. In various embodiments, the clock distribution network 302 is a buffered clock tree, the tree including at least the root 304 and a plurality of clock buffers.

In various embodiments, a reference clock signal is supplied to the root 304 (also referred to herein as "clock source 304") of the clock distribution network 302, and its source can be a crystal, a phase-locked loop (PLL), a clock up/down-converter, or any other generator of a periodic clock signal. In some embodiments, such as illustrated in FIG. 3, the root is a clock source 304 or other clock signal generator that generates a clock signal for driving the clock tree within the IC 300. The clock source 304 is implementable using various types of clock circuitry, including a phase locked loop (PLL), a delay locked loop (DLL), delay circuitry, and any other type of circuit capable of producing clock signals.

As previously described in more detail with respect to FIG. 2, each of the clock nodes 308 (e.g., clock node 308*a*, clock node 308*b*, and clock node 308*c*) includes a clock control module (not shown) implemented on a per node basis. As shown, clock node 308*b* receives a clock request signal from clock consumer 306*a* and also receives a clock request signal from clock consumer 306*b*. Upon receiving the one or more clock request signals, the clock node 308*b* initiates its own clock request signal to its parent clock node immediately upstream (i.e., clock node 308*a*). Upon receiving a clock acknowledgment signal (not shown) from clock node 308*a*, the clock node 308*b* asserts a clock enable signal to a clock buffer (not shown) at clock node 308*b* to turn on (or continue toggling) clock outputs to the downstream clock consumers 306*a*, 306*b* and also acknowledge to the downstream consumers accordingly.

In the illustrative example of FIG. 3, neither clock consumer 306*c* nor clock consumer 306*d* currently need a clock signal (e.g., both consumers are idle or in low-power mode) and therefore withdraw (or otherwise de-asserts) their respective clock request signals to clock node 308*c*. Based on not receiving any clock request signals (or receiving de-assertion signals) from downstream, the clock node 308*c* withdraws (or otherwise de-asserts) its own clock request signal to its parent clock node immediately upstream (i.e., clock node 308*a*). Further, based at least in part on not receiving any clock request signals from downstream, the clock node 308*c* also de-asserts a clock enable signal to a clock buffer (not shown) at clock node 308*c*, thereby disabling the clock buffer and reducing unnecessary power dissipation on its downstream clocking network. In this manner, each clock node 308 regulates its toggling activity by monitoring whether immediately downstream clock nodes have made clock requests and reporting that information to an immediately upstream clock node.

When applied recursively on a per-node basis, this information as to whether a clock signal is needed is populated from the bottom up (i.e., each endpoint clock signal consumer or node informs its immediately upstream clock node as to whether a clock signal is needed or not). For example, in various embodiments, a clock node 308 turns off its clock buffer and disables its clock request signal to its parent node (e.g., can be binary on a single signal line, where bit value '1'=need clock signal and bit value '0'=don't need clock signal) when a clock request signal is not received from downstream. In the embodiment of FIG. 3, portions of the clock distribution network 302 between clock node 308*c* and downstream components are turned off to reduce unnecessary transmission power along the clock distribution network 302 and reduce overall power consumption.

Figure 4:
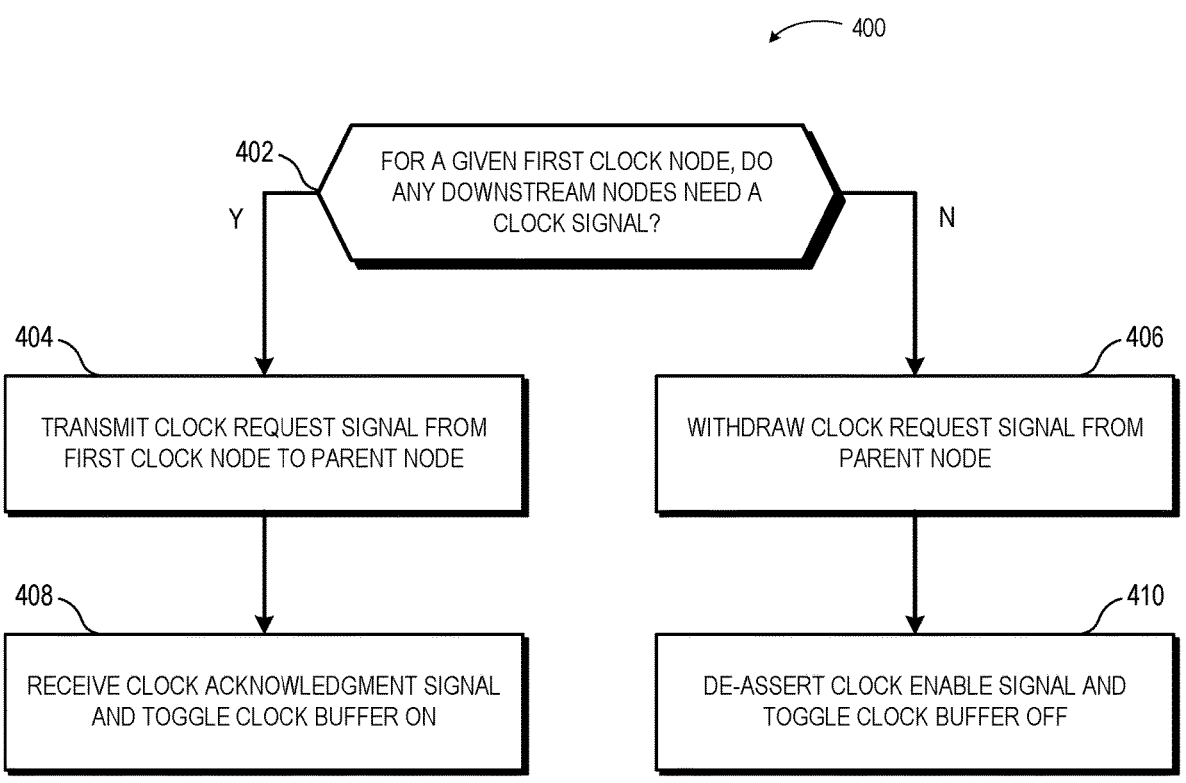
FIG. 4 is a block diagram of a method of performing clock network control in accordance with some embodiments.

Referring now to FIG. 4, illustrated is a block diagram of a method 400 of performing clock distribution network control in accordance with some embodiments. For ease of illustration and description, the method 400 is described below with reference to, and in an example context of, the systems and devices of FIGS. 1-3. However, the method 400 is not limited to these example contexts, but instead in different embodiments is employed for any of a variety of possible system configurations using the guidelines provided herein.

The method 400 begins at block 402 with determining, at a first clock node of a plurality of clock nodes within a clock distribution network, a downstream clock request status. For example, such as previously described with respect to FIG. 2, the clock control module 212 of each clock node 208 includes a clock control interface 214 having one upstream clock request/acknowledge interface 216 and one (or more) downstream clock request/acknowledge interfaces 218. Each clock control module 212 determines whether clock signals should be enabled or disabled based on clock requests received (or not received) from downstream nodes. Similarly, such as previously described with respect to FIG. 3, each of the clock nodes 308 (e.g., clock node 308*a*, clock node 308*b*, and clock node 308*c*) includes a clock control module (not shown) implemented on a per node basis that determines whether clock requests are received from downstream nodes.

If the first clock node determines at block 402 that one or more downstream nodes have requested a clock signal, the method 400 proceeds to block 404. In various embodiments, such a determination is made based on the first clock node receiving an asserted clock request signal from one or more child nodes downstream of the first clock node. Otherwise, if the first clock node determines at block 402 that none of the downstream nodes have requested a clock signal, the method 400 proceeds to block 406. In various embodiments, such a determination is made based on the first clock node receiving a de-asserted clock request signal from all child nodes of the first clock node.

At block 404, after determining one or more downstream nodes have requested a clock signal, the first clock node transmits a clock request signal to a parent node upstream of the first clock node. For example, such as previously described with respect to FIG. 2, if a clock control interface 214 of a clock control module 212 receives one or more clock requests from downstream at its downstream clock request/acknowledge interfaces 218, then the clock control interface 214 initiates a clock request 220 via its upstream clock request/acknowledge interface 216 to a parent clock node immediately upstream. Similarly, such as previously described with respect to FIG. 3, clock node 308*b* receives a clock request signal from clock consumer 306*a* and also receives a clock request signal from clock consumer 306*b*. Upon receiving the one or more clock request signals, the clock node 308*b* initiates its own clock request signal to its parent clock node immediately upstream (i.e., clock node 308*a*).

The method 400 then proceeds to block 408 at which the first clock node toggles a clock buffer based at least in part on the clock request signal to the parent node upstream of the first clock node. For example, such as previously described with respect to FIG. 2, the transmitted clock request 220 triggers a clock acknowledgement 222 that is returned to the first clock node from upstream indicated that the upstream clock supply is available. Based on receiving that clock acknowledgement signal, the clock control interface 214 asserts a clock enable signal 224 to a clock buffer 226 of the clock control module 212. This clock enable signal 224 instructs the clock buffer 226 to turn on clock signal distribution to downstream clock nodes and also acknowledges to the downstream consumers accordingly. Similarly, such as previously described with respect to FIG. 3, upon receiving a clock acknowledgment signal (not shown) from clock node 308a, the clock node 308b asserts a clock enable signal to a clock buffer (not shown) at clock node 308b to turn on (or continue toggling) clock outputs to the downstream clock consumers 306a, 306b and also acknowledge to the downstream consumers accordingly.

Referring now to block 406, after receiving a de-asserted clock request signal from all child nodes of the first clock node, the first clock node withdraws a clock request signal to a parent node upstream of the first clock node. For example, such as previously described with respect to FIG. 2, if the clock control interface 214 does not receive a clock request signal at any of its downstream clock request/acknowledge interfaces 218, then the clock control interface 214 withdraws (or otherwise de-asserts) the clock request 220 via its upstream clock request/acknowledge interface 216 to the parent clock node immediately upstream. Similarly, such as previously described with respect to FIG. 3, neither clock consumer 306c nor clock consumer 306d currently need a clock signal (e.g., both consumers are idle or in low-power mode) and should therefore withdraw (or otherwise de-asserts) their respective clock request signals to clock node 308c. Based on not receiving any clock request signals (or receiving de-assertion signals) from downstream, the clock node 308c withdraws (or otherwise de-asserts) its own clock request signal to its parent clock node immediately upstream (i.e., clock node 308a).

Additionally, at block 410, the first clock node toggles a clock buffer by de-asserting a clock enable signal to the clock buffer of the first clock node. For example, such as previously described with respect to FIG. 2, the clock control interface 214 de-asserts, based at least in part on not receiving any clock request signals at any of its downstream clock request/acknowledge interfaces 218, the clock enable signal 224 to the clock buffer 226 to disable the clock buffer for reducing unnecessary power dissipation on its downstream clocking network. When the clock buffer 226 is turned off, the clock buffer output wiring (i.e., wires driven by the clock buffer 226) also stops toggling. That is, each clock node 208 regulates its toggling activity by monitoring whether immediately downstream clock nodes have made clock requests and reporting that information to an immediately upstream clock node. Similarly, with respect to FIG. 3, based at least in part on not receiving any clock request signals from downstream, the clock node 308c also de-asserts a clock enable signal to a clock buffer (not shown) at clock node 308c, thereby disabling the clock buffer and reducing unnecessary power dissipation on its downstream clocking network. In this manner, each clock node 308 regulates its toggling activity by monitoring whether immediately downstream clock nodes have made clock requests and reporting that information to an immediately upstream clock node.

In various embodiments, a clock node 208 turns off its clock buffer 226 and disables its clock request signal 220 to its parent node (e.g., can be binary on a single signal line, where bit value '1'=need clock signal and bit value '0'=do not need clock signal) when a clock request signal is not received from downstream. Otherwise, the clock buffer 226 is kept on and the clock node 208 continues sending a clock request signal to its parent node. When applied recursively on a per-node basis, this information as to whether a clock signal is needed is populated from the bottom up (i.e., each endpoint clock signal consumer or node informs its immediately upstream clock node as to whether a clock signal is needed or not).

Accordingly, as discussed herein, handshaking-based clock network control mechanisms allows for the toggling of clock supply on a per clock node basis. By only toggling on the clocking branches leading to active clock consumers (and disabling the clock outputs of inactive clocking branches), power usage along the global clock distribution network is decreased. This is particularly helpful for system architectures in which the global clocking network spreads out widely to different areas of the die for which the IP consumer tiles may be located in the physical layout (e.g., power usage becomes substantial as clock network size increases). The scalability and modular nature of the per clock node toggling also allows ongoing expansion of the SOC global clocking network towards additional downstream directions (e.g., to support additional IP endpoints in an SOC) while continuing to preserve the integrity of the upstream module operations. This design serves as a power friendly fundamental clock control building block for clock node development and expansion in an SOC, and provides a scalable modular design which can be applied to any clock node of a global clock distribution network.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
transmitting, by an upstream clock interface of clock control circuitry of a first clock node of a plurality of clock nodes within a clock distribution network for a single clock source and based at least in part on a downstream clock request status received at one or more downstream clock interfaces of the clock control circuitry, a clock request signal to a parent node upstream of the first clock node;
enabling a clock buffer of the clock control circuitry to turn on clock signal distribution based at least in part on the one or more downstream clock interfaces receiving an asserted clock request signal from one or more child nodes downstream of the first clock node;
toggling, based at least in part on the clock request signal to the parent node, the clock buffer of the first clock node, wherein the clock buffer is configured to distribute a clock signal to the one or more child nodes downstream of the first clock node; and
turning off the clock buffer of the first clock node based at least in part on not receiving an asserted clock request signal from the one or more child nodes downstream of the first clock node while keeping on a clock buffer of a second clock node of the plurality of clock nodes within the clock distribution network for the single clock source based at least in part on the second clock node receiving an asserted clock request signal from one or more child nodes downstream of the second clock node.

2. The method of claim 1, further comprising withdrawing the clock request signal to the parent node upstream of the first clock node based at least in part on not receiving an asserted clock request signal from the one or more child nodes downstream of the first clock node.

3. The method of claim 1, further comprising:
receiving, at the first clock node, a clock acknowledgment signal from the parent node; and
asserting, based at least in part on the clock acknowledgment signal, a clock enable signal to the clock buffer of the first clock node.

4. The method of claim 3, wherein the clock enable signal instructs the clock buffer to output a clock signal to the one or more child nodes downstream of the first clock node.

5. The method of claim 1, wherein determining the downstream clock request status includes receiving a de-asserted clock request signal from all child nodes of the first clock node.

6. The method of claim 5, further comprising:
de-asserting, based at least in part on the received de-asserted clock request signal, a clock enable signal to the clock buffer of the first clock node.

7. The method of claim 6, further comprising:
withdrawing, by the first clock node and based at least in part on the received de-asserted clock request signal, a clock request to the parent node upstream of the first clock node.

8. A system, comprising:
a single clock source; and
a clock distribution network for the single clock source, wherein the clock distribution network includes:
a plurality of clock nodes, each clock node comprising clock control circuitry comprising an upstream clock interface, one or more downstream clock interfaces, and a clock buffer;
a first clock node of the plurality of clock nodes, wherein the first clock node is to enable the clock buffer of the first clock node to turn on clock signal distribution to a child node downstream of the first clock node based at least in part on a downstream clock request status received from the child node at the one or more downstream clock interfaces of the clock control circuitry of the first clock node, and wherein the first clock node is to turn off the clock buffer based at least in part on not receiving an asserted clock request signal from one or more child nodes downstream of the first clock node;
a second clock node of the plurality of clock nodes, comprising a clock buffer that is kept on based at least in part on the second clock node receiving at the one or more downstream clock interfaces of the clock control circuitry of the second clock node an asserted clock request signal from one or more child nodes downstream of the second clock node, wherein the clock control circuitry of the second clock node is to initiate a clock request signal via the upstream clock interface of the clock control circuitry of the second clock node; and
a parent clock node upstream of the second clock node, wherein the parent node is configured to receive the clock request signal from the second clock node based at least in part on the downstream clock request status.

9. The system of claim 8, wherein the clock buffer is configured to toggle based at least in part on the clock request signal to the parent node.

10. The system of claim 9, wherein the upstream clock interface is configured for communication with the parent node.

11. The system of claim 10, wherein the one or more downstream clock interfaces are configured for communication with a plurality of downstream child nodes including the child node.

12. The system of claim 11, wherein the first clock node is configured to receive, at the one or more downstream clock interfaces, an asserted clock request signal from one or more child nodes downstream of the first clock node.

13. The system of claim 12, wherein the first clock node is configured to receive, at the upstream clock interface, a clock acknowledgment signal from the parent node.

14. The system of claim 8, wherein the first clock node is to withdraw the clock request signal to the parent node based at least in part on not receiving a clock request signal from the child node.

15. An integrated circuit device, comprising:

a single clock source that drives a clock distribution network, wherein the clock distribution network includes:

a plurality of clock nodes, each clock node comprising clock control circuitry comprising an upstream clock interface, one or more downstream clock interfaces;

a first clock node of the plurality of clock nodes, wherein the first clock node is configured to transmit a clock request signal via the upstream clock interface of the clock control circuitry of the first clock node based at least in part on a downstream clock request status received at the one or more downstream clock interfaces of the clock control circuitry of the first clock node from a child node downstream of the first clock node and toggle a first clock buffer of the first clock node to distribute a clock signal to one or more child nodes downstream of the first clock node, wherein the first clock node is to turn off the first clock buffer based at least in part on not receiving an asserted clock request signal from one or more child nodes downstream of the first clock node; and a second clock node of the plurality of clock nodes, comprising a second clock buffer that is kept on based at least in part on the second clock node receiving an asserted clock request signal at the one or more downstream clock interfaces of the clock control circuitry of the second clock node from one or more child nodes downstream of the second clock node.

16. The integrated circuit device of claim 15, wherein the first clock buffer is configured to toggle based at least in part on the clock request signal to a parent node upstream of the first clock node.

17. The integrated circuit device of claim 16, wherein the first clock node is configured to receive, at the upstream clock interface, a clock acknowledgment signal from the parent node.

18. The integrated circuit device of claim 16, wherein the first clock node is to withdraw the clock request signal to the parent node based at least in part on not receiving a clock request signal from the one or more child nodes downstream of the first clock node.

* * * * *